United States Patent
Batten et al.

(10) Patent No.: US 11,267,726 B1
(45) Date of Patent: Mar. 8, 2022

(54) GREASE TRAP WITH SAFETY BARRIER

(71) Applicant: Thermaco, Incorporated, Asheboro, NC (US)

(72) Inventors: William C. Batten, Asheboro, NC (US); Zachary Michael Rubeor, Greensboro, NC (US); Erwin F. Hani, Fletcher, NC (US)

(73) Assignee: Thermaco, Incorporated, Asheboro, NC (US)

( * ) Notice: Subject to any disclaimer, the term of this patent is extended or adjusted under 35 U.S.C. 154(b) by 0 days.

(21) Appl. No.: 17/196,020

(22) Filed: Mar. 9, 2021

Related U.S. Application Data

(60) Provisional application No. 62/986,868, filed on Mar. 9, 2020.

(51) Int. Cl.
| | | |
|---|---|---|
| *E03F 5/16* | (2006.01) | |
| *C02F 1/40* | (2006.01) | |
| *B01D 17/02* | (2006.01) | |
| *B01D 17/12* | (2006.01) | |
| *B01D 21/24* | (2006.01) | |
| *C02F 101/32* | (2006.01) | |
| *C02F 103/32* | (2006.01) | |

(52) U.S. Cl.
CPC ............ *C02F 1/40* (2013.01); *B01D 17/0214* (2013.01); *B01D 17/12* (2013.01); *B01D 21/2483* (2013.01); *E03F 5/16* (2013.01); *C02F 2101/32* (2013.01); *C02F 2103/32* (2013.01); *C02F 2201/002* (2013.01)

(58) Field of Classification Search
CPC .......... E03F 5/16; C02F 1/40; B01D 17/0211; B01D 17/0214; B01D 17/12; B01D 21/2483
USPC ........................... 210/532.1, 532.2, 538, 540
See application file for complete search history.

(56) References Cited

U.S. PATENT DOCUMENTS

| | | | | |
|---|---|---|---|---|
| 175,508 | A  * | 3/1876 | Schieffelin | ......... B01D 17/0214 210/336 |
| 6,475,381 | B1 * | 11/2002 | Gustafsson | ............ B01D 21/02 210/532.1 |
| 7,367,459 | B2 | 5/2008 | Batten et al. | |
| 7,540,967 | B2 | 6/2009 | Batten et al. | |
| 7,641,805 | B2 | 1/2010 | Batten et al. | |
| 8,002,139 | B1 | 8/2011 | Batten et al. | |
| 8,512,556 | B2 * | 8/2013 | Duran | ....................... E03F 5/16 210/538 |
| 9,932,247 | B1 | 4/2018 | Batten et al. | |

(Continued)

FOREIGN PATENT DOCUMENTS

| | | |
|---|---|---|
| WO | WO 2019-089686 | 5/2019 |
| WO | WO 2020-076593 | 4/2020 |

*Primary Examiner* — Christopher Upton
(74) *Attorney, Agent, or Firm* — MacCord Mason PLLC

(57) ABSTRACT

A grease trap for separating waste from wastewater includes a tank having an outer wall, bottom and open top. An inlet invert in the tank receives incoming wastewater, and an outlet invert removes water from the tank. The tank has a cover on the open top, and the cover has a hatch. A barrier spans a diameter of the open top below the cover and has an opening vertically below the hatch. A divider divides the tank into an upper chamber and a lower chamber and has a hole for allowing FOG into the upper chamber from the lower chamber, the hole being colinearly aligned with the hatch and the opening in the barrier.

20 Claims, 5 Drawing Sheets

(56) References Cited

U.S. PATENT DOCUMENTS

| | | | |
|---|---|---|---|
| 2014/0150877 A1* | 6/2014 | Batten | E03F 5/16 137/1 |
| 2020/0109067 A1* | 4/2020 | Gonzalez | B01D 17/0211 |
| 2020/0246736 A1* | 8/2020 | Batten | E03F 5/16 |
| 2020/0370290 A1* | 11/2020 | Yeoman | E03F 5/16 |
| 2021/0164215 A1* | 6/2021 | Batten | E03F 5/16 |

* cited by examiner

GREASE TRAP WITH SAFETY BARRIER

This application claims the benefit of U.S. provisional application No. 62/986,868, filed Mar. 9, 2020, which is incorporated herein by reference in its entirety.

Conventionally, grease traps have been used in restaurants and other commercial facilities to limit the amount of fats, oils and grease (referred to as FOG) and solid waste that is carried into sewer systems via wastewater. Typical grease traps are either passive grease traps or automatic grease traps. Passive grease traps are usually only emptied of the waste periodically and therefore waste tends to build up inside the tank. Passive grease traps typically include a tank with an inlet that brings in wastewater and an outlet that carries water out of the system. Lightweight grease rises to the top of the tank and heavier solids settle in the bottom of the tank.

Such grease traps are usually installed on the premises of the restaurant or other commercial facility. Since they trap FOG that would otherwise enter a sewer line, they are usually installed in-line with the sewer line, below ground. A common installation location is the parking lot or driveway for the restaurant. As the trap collects FOG, it can reach a capacity where it no longer can successfully collect additional FOG, and it is commonplace for a pumper truck to come to pump out collected FOG and solids that may be trapped and take them to a processing plant. This is done by removing a cover that is generally co-planar with the parking surface, inserting a suction device, suctioning the contents of the trap into the truck, and replacing the cover when the FOG has been removed from the trap.

Unfortunately, there have been instances in which the cover has not been replaced securely, and children have fallen into the trap. There is a need in the art to reduce the risk of such incidents.

SUMMARY OF THE INVENTION

The present invention addresses this need in the art by providing a grease trap for separating waste from wastewater including a tank having an outer wall, bottom and open top. An inlet invert in the tank receives incoming wastewater, and an outlet invert removes water from the tank. The tank has a cover on the open top, and the cover has a hatch. A barrier spans a diameter of the open top below the cover and has an opening vertically below the hatch.

Typically, the barrier is extensive enough to prevent a child from falling into the tank if the cover is removed from the tank.

The tank may have a divider that divides the tank into an upper chamber and a lower chamber and that has a hole for allowing FOG into the upper chamber from the lower chamber, the hole being colinearly aligned with the hatch and the opening in the barrier.

The outlet invert preferably has a receiving end below the divider. The outlet invert, inlet invert and divider may be provided as separate pieces that are mounted in the tank. The divider may be configured as a bottom of an insert tank that nests within the tank having the outer wall.

The top of the tank may have an intermediate lid for the top, an extension collar supported on the intermediate lid, an upper lid and ground level lid supported on the extension collar. A sensor for sensing a FOG level in the tank and having a tether suspended from the upper lid may be positioned at the intermediate lid.

The opening in the barrier may have an interior gasket. The cover is preferably affixed to intermediate or upper lid, preferably is molded with a recess to receive the hatch so that the hatch and cover are flush when the hatch is closed.

BRIEF DESCRIPTION OF THE DRAWINGS

The invention will be better understood by a reading of the Detailed Description of the Examples of the Invention along with a review of the drawings, in which.

DETAILED DESCRIPTION OF EXAMPLES OF THE INVENTION

Figure 1:
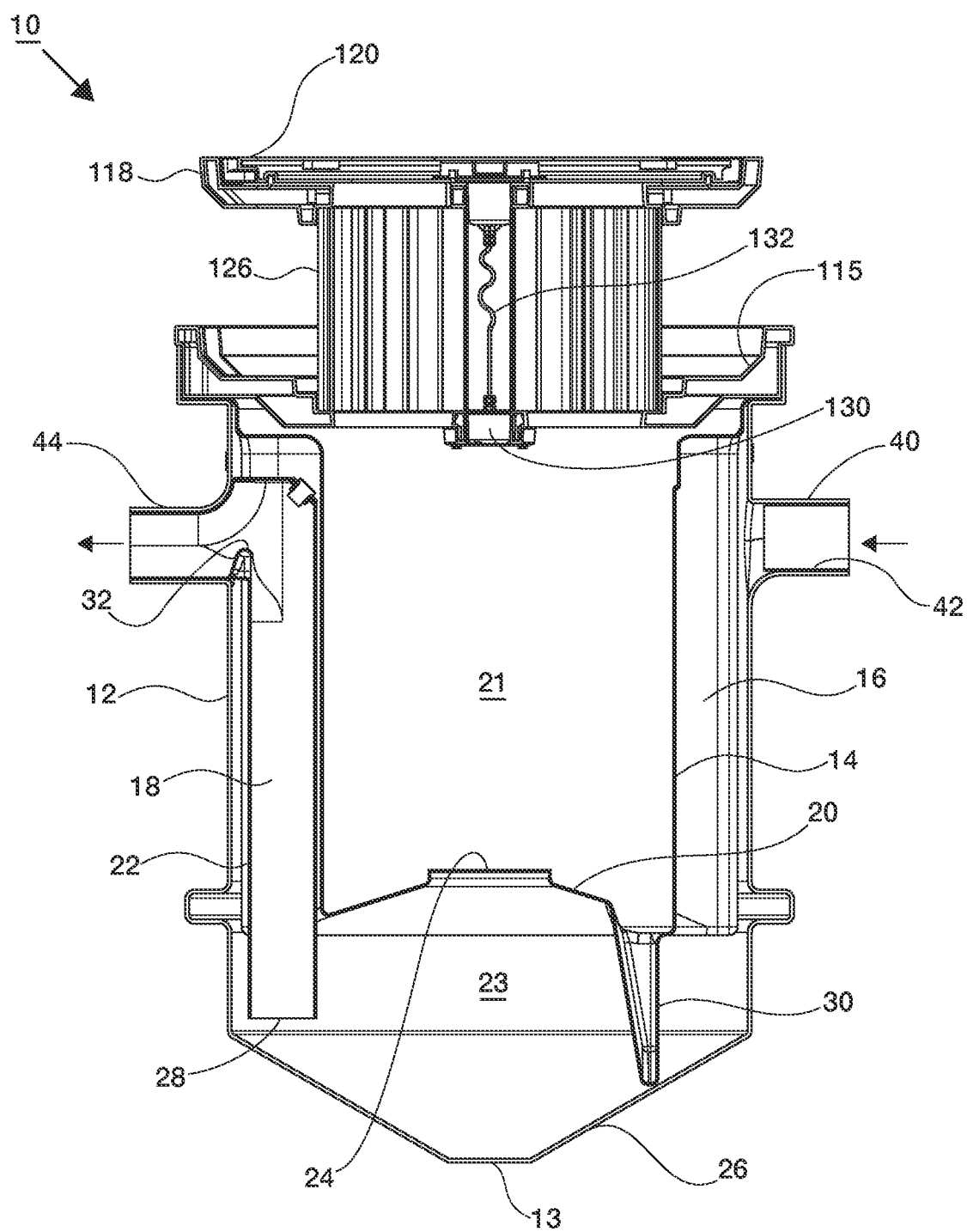
FIG. 1 shows a sectional view through the middle of a grease trap including the middle of inlet and outlet channels.

The grease trap 10 shown in FIG. 1 has an outer tank 12, including an inlet fitting 40 and an outlet fitting 44. An insert tank 14 snugly fits into the outer tank 12 but has channels that define an inlet flow path 16 for incoming effluent and an outlet flow path 18 for grey water that is allowed to pass to sewer lines. A baffle 30 may be included on the bottom of the insert tank 14 to direct incoming effluent low in the tank 12.

The insert tank 14 has a divider 20 dividing the volume within the outer tank into an upper chamber 21 and a lower chamber 23. A hole 24 in the divider 20 allows FOG to rise into the upper chamber 21 from the lower chamber 23. The insert can provide multiple levels of dividers, such as those disclosed in International patent application no. PCT/US2019/054390.

A tube 22 or outlet invert extends the outlet flow path 18 downward so that flow path begins as the entrance 28 to the tube 22 below the divider 20, which helps assure that only grey water quite free of FOG exits the outlet 44. The outlet invert, inlet invert and divider may include separate pieces that are mounted in the tank 12. The tank 12 has a bottom that slopes downwardly from the perimeter to a central location 13.

FIG. 1 also shows an extension collar that can be used to enable the grease trap 10 to be buried at an appropriate depth for sewer fittings and yet have an access from ground level. The extension collar 126 rests on an intermediate lid 115 on the tank 12. An upper lid 118 is at ground level, supported by the collar 126 (and fill that surrounds the collar) and a ground level lid 120 nests in the upper lid 118. An FOG sensor 130 at the intermediate lid 115 is tied to the upper lid 118 by a tether 132. The tether can connect the sensor to electronics in a housing 310 in the upper lid 118. The level sensor 130 can be a level sensor as disclosed in international patent application number WO 2019/089686 A1. The sensor can be used to monitor the build-up of FOG in the trap 10.

Figure 2:
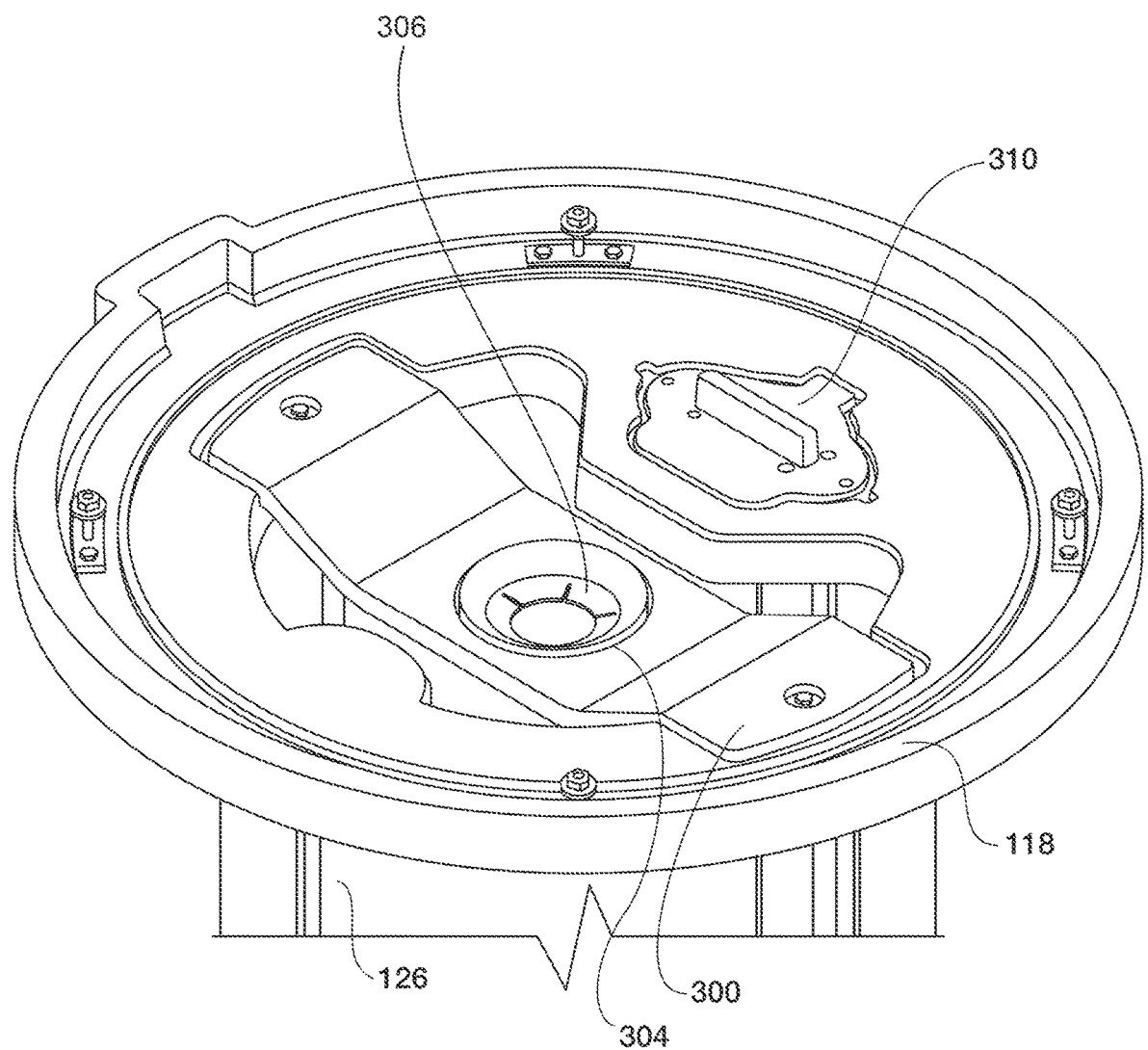
FIG. 2 is perspective view of grease trap upper lid and the barrier.
Figure 3:
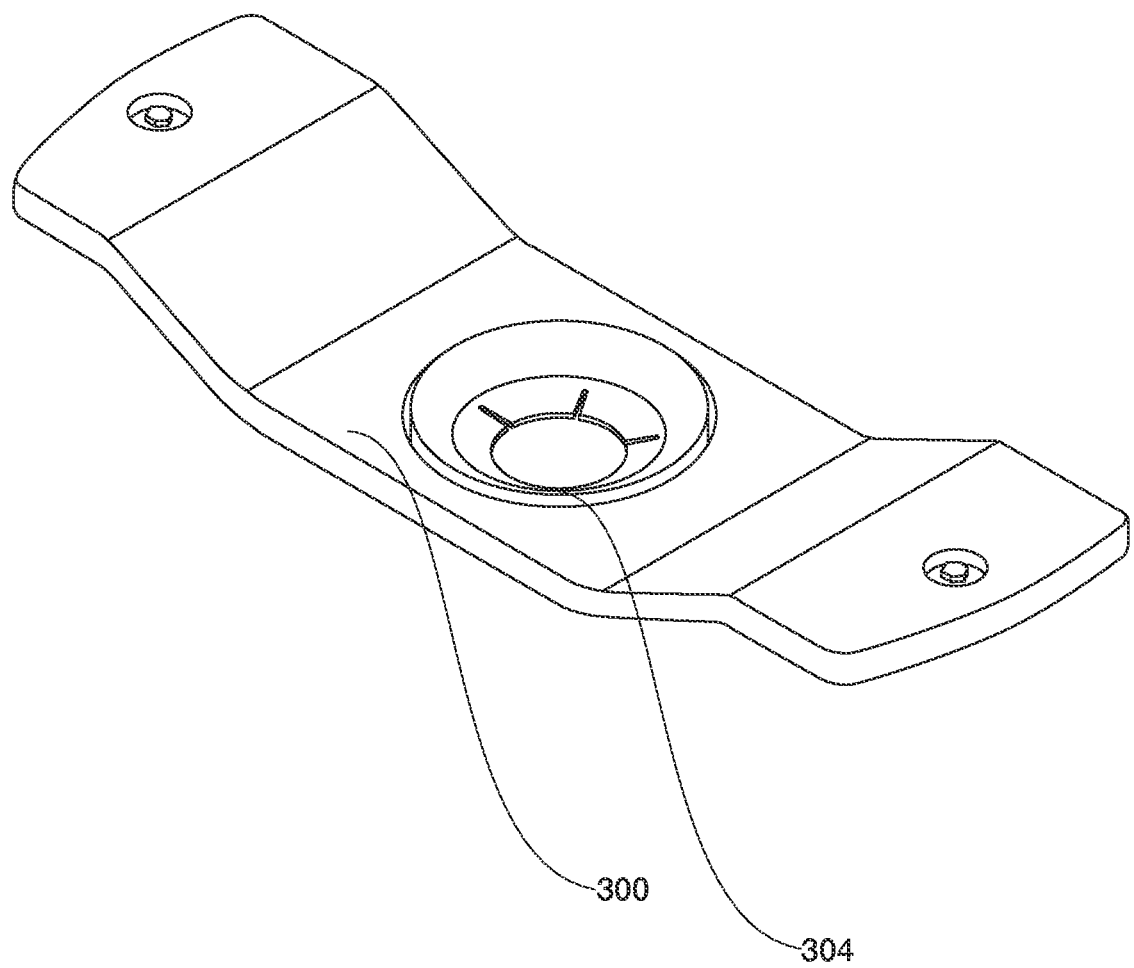
FIG. 3 shows a perspective view of the barrier before installation on the upper lid.

FIG. 2 shows a perspective view of the grease trap's barrier 300 as mounted to the upper lid 118. The barrier 300 has an opening 304 that colinearly aligns under the hatch 302 (see FIG. 4), as well as the hole 24 in the divider and the central location 13 of the bottom of the tank 12. Thus, a pumper can insert a straight tube through the aligned hatch 302, the opening 304, and the hole 24 to reach the central location 13. Then, a pump hose attached to the straight tube can suction the contents of the tank.

The opening 304 preferably, in some examples, has an interior wiper or gasket 306, so that as the pumper's straight tube is withdrawn after pumping, FOG and the like clinging to the tube can be wiped off, to minimize messiness. The gasket 306 can also inhibit the release of malodorous vapors from the ullage of the tank while the tube is inserted.

Figure 4:
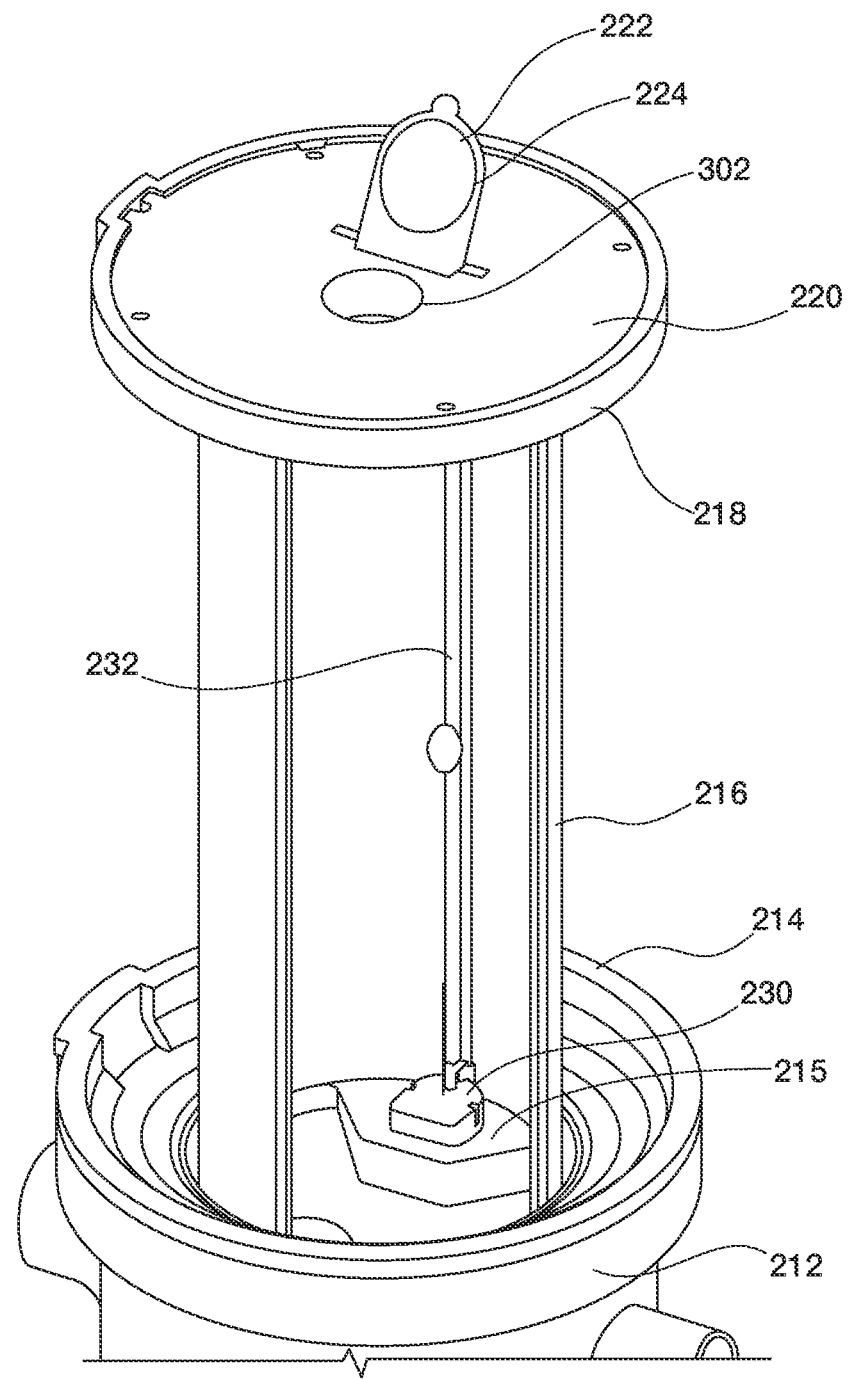
FIG. 4 is perspective view a top of a grease trap showing an extension collar embodiment, partially unassembled, including the cover with the hatch open.
Figure 5:
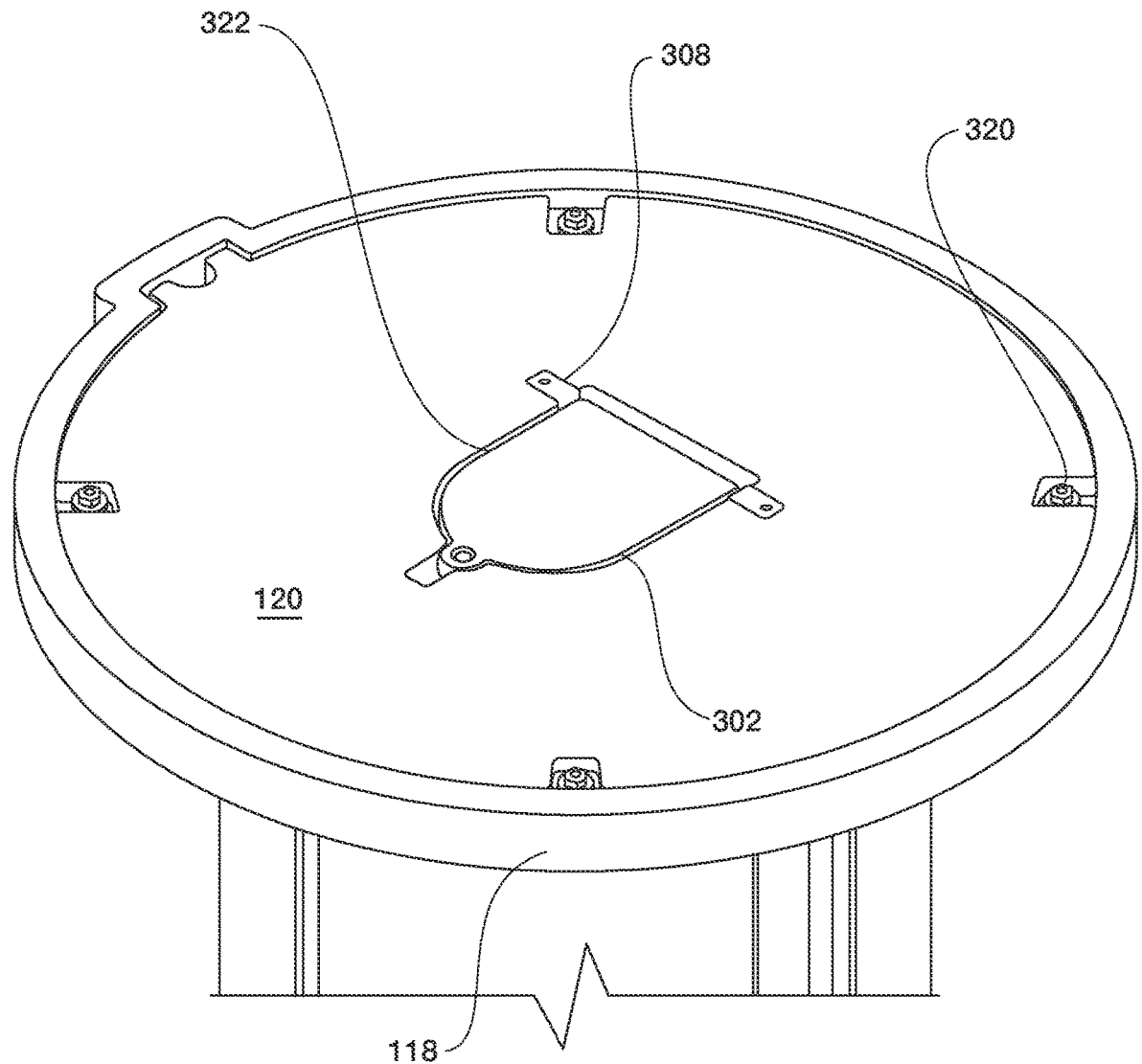
FIG. 5 is an enlarged perspective view of the top including the cover with the hatch closed.

FIG. 5 shows that the cover or ground level lid 120 is bolted to the upper lid 118 as at 320. Other affixations beside bolting may be used, but preferable enable the lid 120 to be removed, discouraging such removal by unauthorized parties. The lid 120 is preferably formed with a recess 322 (not seen in FIG. 4) for the hatch 302, so the hatch and lid are flush when the hatch is closed.

The barrier for the tank can be used in a wide variety of grease traps and/or solids collectors, and in particular in traps constructed and/or operated as disclosed in the patent publications listed below, the disclosures of which are incorporated herein by reference: Passive Grease Trap Using Separator Technology, U.S. Pat. No. 9,932,247, 3 Apr. 2018; Passive Grease Trap Using Separator Technology, U.S. Pat. No. 7,367,459, 6 May 2008; Passive Grease Trap With Pre-Stage For Solids Separation, U.S. Pat. No. 7,641,805, 5 Jan. 2010; Passive Grease Trap Using Separator Technology, U.S. Pat. No. 7,540,967, 2 Jun. 2009; Non-Contact Sensor For Determining A F.O.G. Level In A Separator, US2021/089686, 3 Jun. 2021. The last-mentioned publication is a counterpart to WO 2019/089686, 9 May 2019.

Plastic pipe connections to the grease trap inlet and outlet can be made using the methodology and apparatus disclosed in U.S. Pat. No. 8,002,139 entitled "Method Of Joining A Plastic Tube To Another Tube," the disclosure of which is incorporated herein by reference. For example, a connection to source of effluent such as a kitchen dishwasher or sink can terminate as a pipe end 42 (as seen in FIG. 1) that is inserted in the inlet fitting 40 and secured to fitting 40 using the methodology and apparatus disclosed in U.S. Pat. No. 8,002,139.

FIG. 4 shows another embodiment of an extension collar. In FIG. 4, one of four collar segments (discussed below) has been omitted to illustrate the interior of the collar, but that fourth segment, in some examples, would be in place in use. The intermediate lid 214 supports the collar 216, which in turn supports the upper lid 218 and its ground level lid 220. A pivoting hatch 222 in the cover 220 can be used to allow the insertion of a suction tube when the grease trap needs to be pumped. The intermediate lid 214 includes an inner shelf 215 that is formed with a pocket to nest the look down sensor 230. In this embodiment, the look down sensor is suspended by a tether 232 from the underside of the lid 220.

The sensor 230 can be raised or lowered by the tether 232. This mounting arrangement allows the sensor 230 to be raised so that it can be periodically serviced, such as by replacing batteries. The tether 232 can include a data communication cable to the electronics box 310 to enable FOG height data to be available for local reading or transmission. This sensor enables the height of the FOG layer floating on top of the gray water in tank to be monitored. When the FOG thickness is great enough, the grease trap can be pumped to remove the FOG, collected solid matter, and water in the tank.

The barrier provides a safety measure to prevent falling into the tank when the cover is removed. Similarly, the presence of the hatch in the cover reduces the need to remove the cover to pump the tank, again reducing the risk of falling into the tank. Preferred embodiments use both measures to provide an extra measure of safely.

Certain modifications and improvements will occur to those skilled in the art upon reading the foregoing description. It should be understood that all such modifications and improvements have been omitted for the sake of conciseness and readability but are properly within the scope of the following claims.

What is claimed is:

1. A grease trap for separating waste from wastewater comprising:
   a tank having an outer wall, bottom and open top;
   an inlet invert in the tank for receiving incoming wastewater;
   an outlet invert for removing water from the tank;
   a cover on the open top having a hatch; and
   a barrier spanning a diameter of the open top below the cover and having an opening vertically below the hatch.

2. A grease trap as claimed in claim 1 wherein the barrier is extensive enough to prevent a child from falling into the tank if the cover is removed from the tank.

3. A grease trap as claimed in claim 1 wherein the tank has a divider that divides the tank into an upper chamber and a lower chamber and that has a hole for allowing FOG into the upper chamber from the lower chamber, the hole being colinearly aligned with the hatch and the opening in the barrier.

4. A grease trap as claimed in claim 3 wherein the outlet invert has a receiving end below the divider.

5. A grease trap as claimed in claim 3 wherein the outlet invert, inlet invert, and divider include separate pieces that are mounted in the tank.

6. A grease trap as claimed in claim 5 wherein the divider is a bottom of an insert tank that nests within the tank having a multilayer outer wall.

7. A grease trap as claimed in claim 1 wherein the top of the tank has an intermediate lid for the top, an extension collar configured to be supported on the intermediate lid, an upper lid and ground level lid on the extension collar.

8. A grease trap as claimed in claim 7 further comprising a sensor for sensing a FOG level in the tank and having a tether suspended from the upper lid, the sensor being positioned at the intermediate lid.

9. A grease trap as claimed in claim 1 wherein an opening in the barrier has an interior gasket.

10. A grease trap as claimed in claim 1 wherein the cover is affixed to an intermediate or an upper lid.

11. A grease trap as claimed in claim 1 wherein the cover is molded with a recess to receive the hatch so that the hatch and cover are flush when the hatch is closed.

12. A grease trap for separating solids from wastewater comprising:
    a tank having an outer wall, a bottom downwardly sloping from a perimeter to a central location;
       an inlet invert in the tank for receiving incoming wastewater; and
       an outlet invert for removing water from the tank the tank also acting as a solids collector for collecting solids in wastewater that are heavier than water, the inlet invert opening above the bottom so that solids in the wastewater gravitationally separate towards the bottom as wastewater with reduced solids discharges from the container through the outlet invert;
    a cover on the open top having a hatch; and
    a barrier spanning a diameter of the open top below the cover and having an opening colinearly aligned with the hatch and the central location of the bottom of the tank.

13. A grease trap as claimed in claim 12 wherein the barrier is extensive enough to prevent a child from falling into the tank if the cover is removed from the tank.

14. A grease trap as claimed in claim 13 wherein the tank has a divider that divides the tank into an upper chamber and a lower chamber and that has a hole for allowing FOG into the upper chamber from the lower chamber, the hole being colinearly aligned with the hatch and the opening in the barrier.

15. A grease trap as claimed in claim 14 wherein the outlet invert has a receiving end below the divider.

16. A grease trap as claimed in claim 15 wherein the outlet invert, inlet invert and divider include separate pieces that are mounted in the tank.

17. A grease trap as claimed in claim 16 wherein the divider is a bottom of an insert tank that nests within the tank having a multilayer outer wall.

18. A grease trap as claimed in claim 17 wherein the top of the tank has an intermediate lid for the top, an extension collar configured to be supported on the intermediate lid, an upper lid, and ground level lid on the extension collar.

19. A grease trap as claimed in claim 18 wherein the cover is affixed to the intermediate or upper lid.

20. A grease trap for separating waste from wastewater comprising:
- a tank having an outer wall, a bottom and an open top;
- an inlet invert in the tank for receiving incoming wastewater;
- an outlet invert for removing water from the tank;
- a cover on the open top having a hatch, the cover being molded with a recess to receive the hatch so that the hatch and cover are flush when the hatch is closed;
- a barrier spanning a diameter of the open top below the cover and having an opening vertically below the hatch, the opening in the barrier having an interior gasket; and
- a divider that divides the tank into an upper chamber and a lower chamber and that has a hole for allowing FOG into the upper chamber from the lower chamber, the hole being colinearly aligned with the hatch and the opening in the barrier.

* * * * *